(12) United States Patent
Jennings

(10) Patent No.: X4056
(45) Date of Patent: Mar. 25, 1825

(54) STEAM ENGINE

(76) Inventor: Isaiah Jennings

United States Patent

Patent No.: X4056

Isaiah Jennings
The Schedule referred to in these Letters Patent and made
a part of the same containing a description in the words of
the said Isaiah Jennings himself of his improvements
in the Steam Engine and other Machinery.

---

First Construct a common Cylinder with a flange at each
end projecting externally about one inch. To this cylinder
adapt a piston as usual. A second cylinder must then be
formed large enough to contain or encircle the first. The
outer and inner cylinders must be distant from each other
about one inch and the former must at both ends be firmly
fastened to the outside of the flanges projecting from the latter.
Place one or more of these double cylinders in or over the fire
of the furnace so as to permit the piston [illegible] operating to
act upon the fire beneath and cause the flame and heated air
regularly to ascend & descend with it and the smoke to be
consumed without escaping from the furnace. The vacant
space between the double cylinders receive the water or steam
through a pipe which connects the cylinders and boiler. From
the vacuum thus formed between the outer and inner cyl
inder, the steam passes through the usual pipe and valves
into the chamber of the inner cylinder on the top of the piston;
the steam thus introduced causes the piston to descend and
ascend by a regular movement. The working gear attached
to the pistons may be the same as is used in ordinary steam
engines or may be varied at the direction of the engineer.
The position of the cylinders may also be changed at the
pleasure of the constructor; and cylinders disposed in
the flue of the furnace will equally serve to circulate the heat.
They may also be placed in the furnace without an cylin
case and worked with a double stroke according to the
common practice. Second construct a boiler to con-
tain sist of many divisions but communicating with each other
by pipes. Each division is formed by two iron plates, two
feet square and one quarter of an inch thick. Join the plates
by an iron band about one inch and a quarter in width
and half an inch thick. The edges of each plate should be some
what thickened, and then firmly welded to the edges of the
iron band which is placed between them on all sides, and
by retaining them apart forms the vacuum for that divis-
ion of the boiler. Any number of similar divisions may be
added to constitute the boiler, taking care to connect
them by pipes secured near the edges, the shape and
dimensions of each division may be varied, if thought
expedient, and instead of the connecting band, the plates
may be united with a space between them of about one inch.
by riveting their edges. Each division may be provided
with a spring safety valve, or others may be substituted,
and the water may be introduced into the boiler either at
the top or elsewhere. Third, To fit the piston ex-
actly to the cylinder, and keep it tight, form a ring
at the lower extremity of the piston by a turning lathe, so
as to fit close to the inside of the cylinder. Then from one side
of the metallic ring cut out a piece of a triangular shape
having its vertex at edge of the ring, and the base of the tri
angle directed towards its centre. In the opening thus
formed fit a spring wedge firmly with its sharp edge
against the side of the cylinder. By the pressure of the spri
ing upon the wedge, the latter serves to expand the sides
of the ring upon which it acts, and thus by keeping
it tighter to the inner surface of the cylinder obviates the
inconveniences arising from the wear and tear at the
outer edge of the ring. The spring wedge is kept firm
in its position by corresponding plates placed above and
below the centre plate, and the centre plate has an addi
tional tional plate within it, with one straight side behind the spring wedge and pressing against it; these when thus united form the lower extremity of the piston.

Fourth. To give greater security to the shafts of steam engines water wheels from boats, and other machinery, construct a coupling box in the usual form, except the cogs on the face of each part of the box. These must be made to incline somewhat to a point in imitation of a wedge; acting upon the movable section of the coupling box is a spiral spring fixed around the shaft, and having its opposite extremity resting against a collar, either projecting from the shaft or fixed to it, so as to change its position and if necessary increase or diminish the power of the spring. When the shaft is in motion by the regular power of the engine, the pressure of the spring keeps the boxes united; but if the water wheels of steam boats or other machinery should strike any solid substance and meet with a resistance greater than the power applied, the coupling box by means of the sliding section and spiral spring disunites of itself and will so continue until such resistance ceases, when they again unite by the power of the spring. The peculiar advantages of the preceding improvements consist as follows. First, by placing the piston and cylinder in the furnace, the former draws up the heat and fire and expands the steam more readily; It causes the fire to burn more briskly; consumes the smoke, and also saves fuel. — — — —

Secondly the boiler with straight sides, are stronger, more secure and more easily made. Thirdly, the metalic ring with the spring wedge, is more simple and cheaper than any other, and answers better for packing of pistons. Fourth The coupling box with its spring and slides, prevents the shaft and machinery from breaking

United States Patent

Patent No.: X4056 king, when any sudden shock or violent resistance is encountered: for the same reason the machinery may be made much lighter than with the box used in common.

On account of these advantages therefore. I claim the exclusive privilege. and a patent for the four preceding improvements, securing to me the sole right of construct ing, using and vending the same.

P. M. B. George Bement }
Ap. 22. 1837 P. F. Moore } witnesses

Isaiah Jennings

DRAFTSMAN'S DIVISION.

*All communications should be addressed to*
"The Commissioner of Patents.
Washington, D. C."

2—328 *a.*

*DEPARTMENT OF THE INTERIOR,*

United States Patent Office,

*Washington, D. C.,* , 189

*SIR:*

*The printed* copies *of Patent No.* Jennings
are *exhausted.* Mar 15 1825

*As soon as printed a copy will be mailed you to complete your order.*

*By direction of the Commissioner:*

*Very respectfully,*

*Chief Clerk.*

3143b6-97-5m